(12) United States Patent
Muth et al.

(10) Patent No.: US 7,403,548 B2
(45) Date of Patent: Jul. 22, 2008

(54) SYSTEM FOR INTERFACING MEDIA ACCESS CONTROL MODULE TO SMALL FORM FACTOR PLUGGABLE MODULE

(75) Inventors: James M Muth, Santa Ana, CA (US); Gary Huff, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 952 days.

(21) Appl. No.: 10/454,592

(22) Filed: Jun. 5, 2003

(65) Prior Publication Data

US 2004/0246953 A1 Dec. 9, 2004

(51) Int. Cl.
 *H04J 3/22* (2006.01)
 *H03M 7/00* (2006.01)
 *H03M 9/00* (2006.01)

(52) U.S. Cl. .................. 370/543; 370/545; 341/61; 341/100; 341/101

(58) Field of Classification Search ................. 370/366, 370/465, 466, 468
See application file for complete search history.

(56) References Cited

U.S. PATENT DOCUMENTS

| 4,885,584 | A | 12/1989 | Dalrymple |
| 2002/0107990 | A1 * | 8/2002 | Johnson et al. ............. 709/250 |

FOREIGN PATENT DOCUMENTS

DE 101 08 379 A1 10/2001

EP 0 558 234 A1 9/1993

OTHER PUBLICATIONS

HP Company, "Reduced Gigabit Media Independent Interface (RGMII)", Apr. 1, 2002, Version 2.0.*
Grobert Snively "Gigabit Interface Converter (GBIC)", Revision 5.5, Sep. 27, 2000, pp. 1-5.*
*10/100 PHY Transceiver Product Selector Guide*, Broadcom Corporation, 2 pages, Copyright 2001.
*100BASE-SX Fast Ethernet: A Cost Effective Migration Path for Fiber in the Horizontal*, at http://www.fols.org/pubs/sx_whitepaper0200.html, Fiber Optics LAN Section (FOLS) of the Telecommunications Industry Association (TIA), 7 pages, Feb. 2000, Printed Apr. 4, 2002.
*BCM52081 Product Brief: BCM5208 10/100BASE-TX Quad-ø198 Transceiver*, Broadcom Corporation, 2 pages, Copyright 1999.
*BCM5221 Product Brief: 10/100BASE-TX Single-Channel SIGNI-PHY™ Tranceiver*, Broadcom Corporation, 2 pages, Copyright 2000.

(Continued)

*Primary Examiner*—Seema S. Rao
*Assistant Examiner*—Jianye Wu
(74) *Attorney, Agent, or Firm*—Sterne, Kessler, Goldstein & Fox PLLC

(57) ABSTRACT

A communication system includes a link module having a first serial interface for interfacing to a serial link. The link module also including a second serial interface. The system also includes a Media Access Control (MAC) module including a parallel interface. The system also includes a converter module, coupled between the parallel interface and the second serial interface, configured to convert symbols, transferred between the parallel interface and the second serial interface, between a parallel format at the parallel interface and a serial format at the serial interface.

27 Claims, 7 Drawing Sheets

OTHER PUBLICATIONS

*BCM5228 Product Brief: 10/100BASE-TX/FX OCTAL-ø™ ™ Tranceiver*, Broadcom Corporation, 2 pages, Copyright 2001.

*BCM5411 Product Brief: BCM5411 10/100/1000BASE-T Transceiver*, Broadcom Corporation, 2 pages, Copyright 2001.

*BCM5421 Product Brief: BCM5421 10/100/1000BASE-T Gigabit Copper Transceiver*, Broadcom Corporation, 2 pages, Copyright 2001.

*BCM5421S Product Brief: BCM5421S 10/100/1000BASE-T Gigabit Copper Transceiver w/ SerDes*, Broadcom Corporation, 2 pages, Copyright 2002.

*BCM5464S Product Brief: Quad-Port Gigabit Copper Transceiver With Copper/Fiber Media Interface*, Broadcom Corporation, 2 pages, Copyright 2002.

*BCM5464S Quad-Port Gigabit Copper Transceiver With Copper/Fiber Media Interface*, at http://www.broadband.com/products/5464S.html, Broadcom Corporation, 1 pages, printed Feb. 14, 2003.

*Networking Tutorials: Part 1: Networking Basics*, at http://www.lantronix.com/learning/tutorials/etntba.html, Lantronix, Inc., 7 pages, Copyright 2001, Printed Apr. 4, 2002.

*Statement of Direction: 1000BASE-T—Delivering Gigabit Intelligence on Copper Infrastructure*, at http://www.cisco.com/warp/public/cc/techno/media/lan/gig/tech/1000b_sd.htm, Cisco Systems, Inc., 10 pages, Copyright 1992-2000, Printed Apr. 4, 2002.

European Search Report, from European Patent Appl. No. 04013270.6, dated Jan. 20, 2006, 3 pages.

* cited by examiner

SYSTEM FOR INTERFACING MEDIA ACCESS CONTROL MODULE TO SMALL FORM FACTOR PLUGGABLE MODULE

BACKGROUND OF THE INVENTION

1. Field of the Invention

The present invention relates generally to data communications.

2. Related Art

A known type of data communication device is a small form factor pluggable (SFP) module. Typically, the SFP module plugs into an interface slot in a circuit board populated with other communication devices used in an Ethernet-based system, for example. The SFP module includes a second serial interface, interconnected with the circuit board slot, and a first serial interface, coupled to a serial link, such as a copper or fiber link, for communicating with remote link partners. The SFP module transfers symbols between its first and second interfaces. The second serial interface may include portions of a Serial Gigabit Media Independent Interface (SG-MII) that are compatible with an industry standard SerDes interface. The serial link, coupled with the first serial interface, may be a 10/100/1000 Base-T copper link, or a fiber link, for example.

The SFP module is considered a third generation communication module because it evolved from precursor first and second generation modules. The first generation module is often referred to as a proprietary custom module or device, and includes interfaces similar to the first and second interfaces of the SFP module, described above. The second generation module is referred to as a Gigabit Interface Converter (GBIC) module. Typically, the second interface of the GBIC module is an industry standard GBIC interface compatible with the SerDes interface, and the first interface may be configured according to 10, 100, 1000Base-T copper, 1000Base-SX/LX fiber, or 100Base-FX fiber, for example. The SFP module is similar to the GBIC module, but smaller. For convenience, the first, second and third generation modules described above are each generally referred to herein as a "link module."

Typically, a media access control (MAC) device, such as an Ethernet Switch/MAC, is also mounted onto the circuit board supporting the SFP module (i.e., the link module) described above. In one configuration, the MAC device includes a serial interface compatible with and connected directly to the second serial interface of the link module. In another configuration, the MAC device includes a parallel interface, such as a Reduced Gigabit Media Independent Interface (RGMII), instead of the MAC serial interface. The MAC parallel interface can not be connected directly to the second serial interface of the link module because these two interfaces are incompatible. Therefore, there is a need for an interface arrangement that interconnects the MAC parallel interface and the second serial interface of the link module, and thus enables the MAC and link modules to communicate with one another.

The MAC parallel interface and the serial link coupled with the link module (e.g., the SFP module) may operate at the same or different symbol rates. Therefore, it is desirable that the above mentioned interface arrangement be able to facilitate symbol transfers between the MAC device and the Link module, and over the serial link, when the symbol rates are the same as one another and when the symbol rates are different from one another.

BRIEF SUMMARY OF THE INVENTION

An embodiment of the present invention includes a system having a MAC device or module and a link module. The system includes an interface arrangement that interconnects a parallel interface of the MAC module to a serial interface of the link module, and thus enables the MAC and link modules to communicate with one another. The interface arrangement facilitates symbol transfers between the MAC device and the link module, and over a serial link coupled to the link module, when a symbol rate between the link module and the MAC module and a symbol rate over the serial link are the same as one another and when they are different from one another.

In an embodiment, a communication system includes a link module having a first serial interface for interfacing to a serial link. The link module can be a triple speed 10/100/1000Base-T SFP module. The link module also includes a second serial interface. The system also includes a Media Access Control (MAC) module including a parallel interface, which can be an RGMII. The system also includes a converter module, coupled between the parallel interface and the second serial interface, configured to convert symbols, transferred between the parallel interface and the second serial interface, between a parallel format at the parallel interface and a serial format at the serial interface.

The serial link operates at a first symbol rate, and the link and MAC modules are configured to transfer symbols between one another at a second symbol rate. The link and MAC modules are configured to transfer between one another N times each symbol transferred or to-be-transferred over the serial link, where N>1 when the first symbol rate is less than the second symbol rate, so that an effective symbol rate between the MAC and link modules substantially matches the first symbol rate. N is a ratio of the second symbol rate to the first symbol rate.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention. In the drawings, like reference numbers indicate identical or functionally similar elements. The terms "module" and "device" are used interchangeably and equivalently herein. Also, the terms "interface" and "data interface" are used interchangeably and equivalently herein.

DETAILED DESCRIPTION OF THE INVENTION

Glossary/Definitions

GMII—Gigabit Media Independent Interface. An industry standard parallel data interface that is 25 signals/pins wide at each data port. The 25 signals/pins are associated with both data and control.

RGMII—Reduced Gigabit Media Independent Interface. An industry standard parallel data interface that is 12 signals/pins wide at each data port. The 12 signals/pins are associated with both data and control.

SGMII—Serial Gigabit Media Independent Interface. An industry standard serial data interface.

SerDes Interface—An industry standard serial interface including first and second differential wire pairs (i.e., four wires total) that carry signals in respective opposing directions. The physical layer of the SGMII interface is compatible (that is, can operate) with the SerDes interface.

Symbol—one or more data bits may be combined by any technique into a symbol that can be transmitted in a communication system, as would be apparent to one having ordinary skill in the relevant arts. Thus, a symbol may correspond to one bit (i.e., one bit per symbol), two bits (i.e., two bits per symbol), and so on. A symbol can be a data bit itself.

Overview

Figure 1:
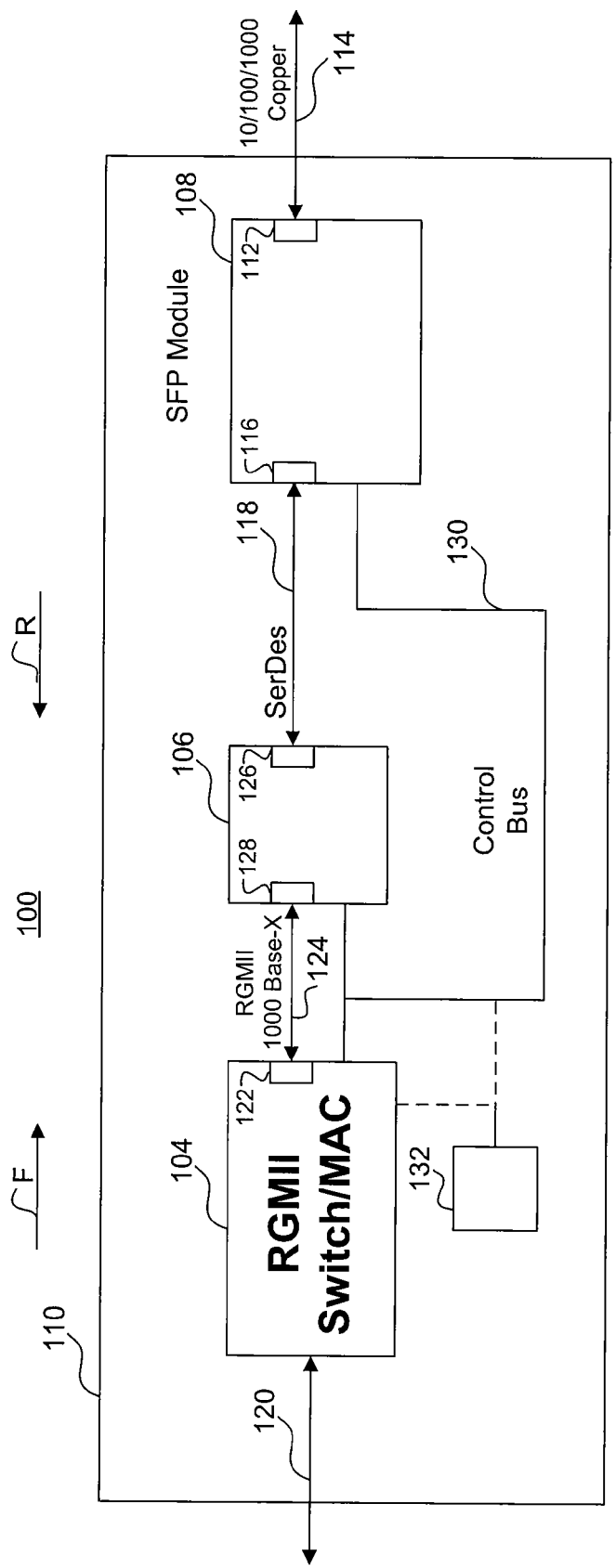
FIG. 1 is a block diagram of an example system constructed and operated in accordance with the principles of the present invention.

FIG. 1 is a block diagram of an example system 100 constructed and operated in accordance with the principles of the present invention. System 100 includes a MAC module 104, a converter module 106, and a link module 108 each connected with or plugged into a circuit board 110. In an embodiment, MAC module 104 is referred to as an RGMII switch/MAC module 104, for reasons that will become apparent from the ensuing description. link module 108 may be any of an SFP, GBIC or proprietary custom module, for example. In an embodiment, modules 104-108 operate according to Ethernet-based standards.

Link module 108 includes a link interface 112 for interfacing with a serial link or interface 114, such as a copper-based serial link. Serial link 114 may be a 10/100/1000Base-T copper link, 1000Base-SX/LX fiber link, 100Base-FX fiber link, or alternative serial link. Link module 108 transmits serial formatted symbols over and receives serial formatted symbols from serial link 114 at a link symbol rate. That is, the symbols are transferred over link 114 at the link symbol rate. In an embodiment, the link symbol rate is variable.

Link module 108 also includes a serial interface 116 for interfacing with a serial link or interface 118, which can be a link that conforms to the SerDes standard. In an embodiment, serial interface 116 includes at least a portion of an SGMII interface that is compatible with a SerDes interface, such as two pairs of differential serial data lines. Link module 108 transmits serial formatted symbols over and receives serial symbols from serial link 118. In an embodiment, serial link 118 operates at a fixed symbol rate, such as at 1,000 Mega-symbols-per-second (Msps).

MAC module 104 exchanges symbols with an external agent (not shown in FIG. 1) over an interface 120 including multiple external links. MAC module 104 also includes a parallel interface 122 for interfacing with a parallel link 124. MAC module 122 transmits parallel formatted symbols over and receives parallel formatted symbols from link 124. In an embodiment, parallel link 124 operates at the same fixed symbol rate as serial link 118. In an alternative embodiment, the parallel link 124 operates at a different symbol rate as serial link 118. The parallel link 124 symbol rate is referred to herein as the MAC symbol rate. Also, interface 122 and parallel link 124 can conform to RGMII 1000Base-X interface standards.

Converter module 106, coupled between MAC module 104 and link module 108, includes a serial interface 126 coupled with serial link 118 and a parallel interface 128 coupled with parallel link 124. In an embodiment, serial interface 126 is a SerDes interface and parallel interface 128 is an RGMII 1000Base-X interface. Converter module 106 passes symbols between parallel link 124 and serial link 118, and in doing so, converts the symbols between their parallel format at parallel link 124 and their serial format at serial link 118.

Each of interfaces 112, 116, 122, 126 and 128 can be thought of as incorporating the input/output pads, pins, signals and transceiver elements required to implement the corresponding interface standard, such as the SerDes interface, the RGMII interface, and so on.

System 100 includes a controller for controlling and collecting status from modules 104, 106 and 108 over a control bus 130 coupled to the modules. In an embodiment, the controller is part of, i.e., internal to, MAC module 104. In another embodiment, a controller 132, external to MAC module 104, performs the above-mentioned control and status monitoring functions.

Symbol transfers in system 100 proceed in a forward direction F and a reverse direction R, as indicated in FIG. 1. In the forward direction F, symbols originated at MAC module 104 or link 120 are destined for transfer (i.e., are symbols that are to-be-transferred) over link 114. Thus, system 100 transfers these symbols at the MAC symbol rate over link 124, through converter module 106, and over link 118 to link module 108. Then, link module 108 transmits the symbols over serial link 114 at what is hereinafter referred to as the link symbol rate.

In the reverse direction R, link module 108 receives symbols transferred over link 114 at the link symbol rate. System 100 transfers these symbols over link 118, through converter module 106, and over link 124 to MAC module 104. Then, MAC module 104 transmits the symbols over link 120.

Links 124 and 114 operate at the same symbol rate, which may be either the same as or greater than link 118, which is hereinafter referred to as the converter symbol rate. Let a ratio N be equal to the converter symbol rate divided by the link symbol rate. Thus, N>1 when the converter symbol rate is greater than the link symbol rate, and N=1 when the converter and link symbol rates match one another. System 100 is configured such that converter module 106 and link module 108 transfer between one another N times each symbol transferred (in the reverse direction R), or to-be-transferred (in the forward direction F), over serial link 114, so that an effective symbol rate between converter module 106 and link module 108 substantially matches the link symbol rate. That is, each symbol transferred, or to-be-transferred, over link 114 is also transferred N times between converter and link modules 106 and 108, to achieve the effective symbol rate between the converter and link modules.

In the case where the converter symbol rate is greater than the link symbol rate, transferring each symbol multiple times between converter and link modules 106 and 108 has the effect of equalizing the otherwise mismatched converter and link symbol rates, and thereby advantageously avoids the need for overflow and underflow symbol buffers in system 100. In an example, assume the link symbol rate is 100 Msps, and the converter symbol rate is 1,000 Msps. Then N=10 (1,000/100), and each symbol transferred over link 114 at 100

Msps is also transferred ten (10) times between the converter and link modules 106 and 108.

On the other hand, in the case where the converter symbol rate is the same as the link symbol rate, system 100 is configured such that converter module 106 and link module 108 transfer between one another only one time each symbol transferred (in the reverse direction R) or to-be-transferred (in the forward direction F) over serial link 114. In this case, N=1.

Figure 2:
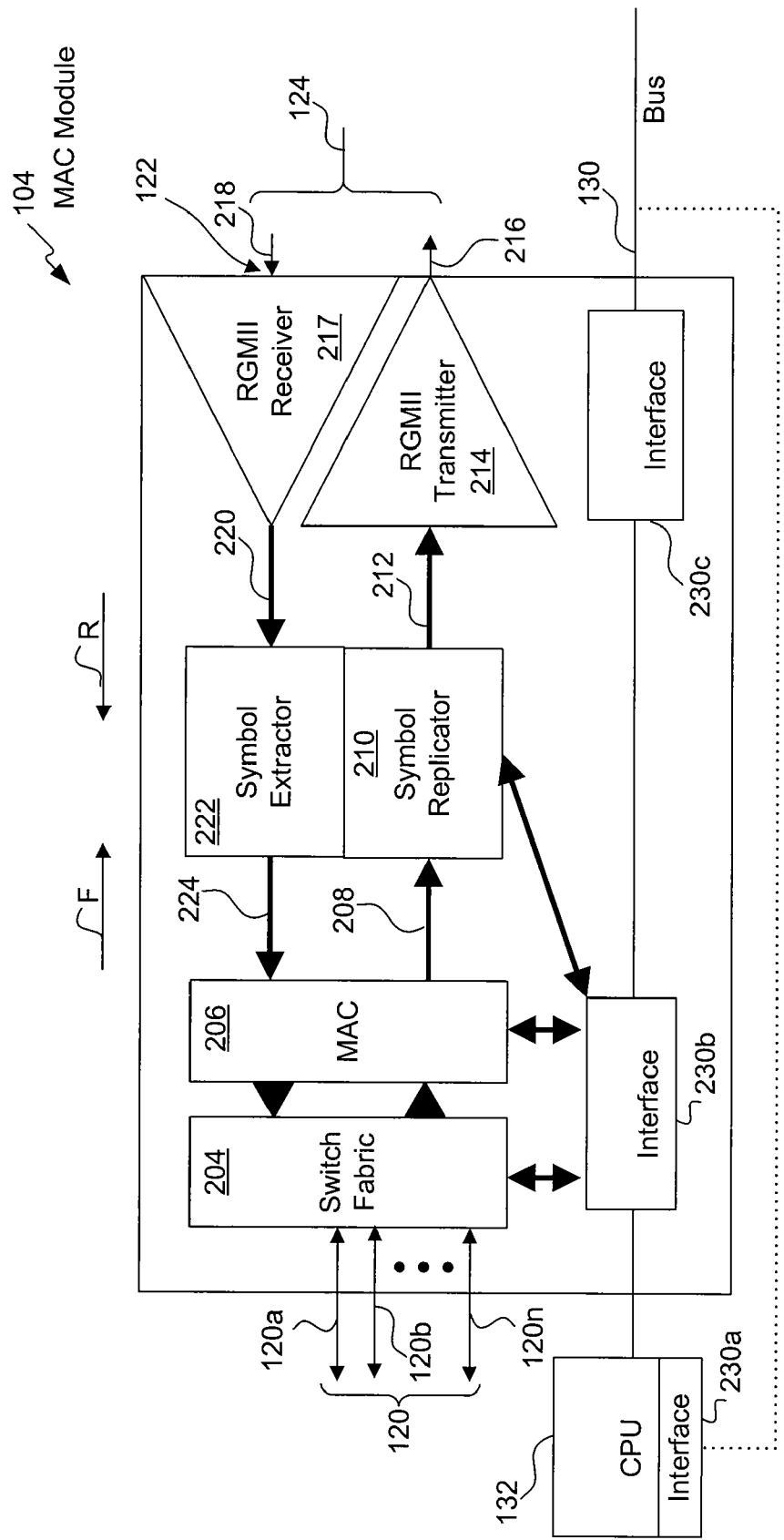
FIG. 2 is a block diagram of an example arrangement of a MAC module of the system of FIG. 1.

FIG. 2 is a block diagram of an example arrangement of MAC module 104. MAC module 104 includes a switch fabric 204 coupled with links 120 and a MAC controller 206. MAC controller 206 implements MAC protocols as would be appreciated by one having ordinary skill in the relevant art(s). In the forward direction, switch fabric 204 selectively routes symbols from links 120 to MAC controller 206. In turn, MAC controller 206 provides symbols 208 to a programmable symbol replicator 210.

Symbol replicator 210 is programmed to produce N same symbols 212 for each symbol it receives, where N is the ratio of the converter symbol rate to the link symbol rate. Thus, N>1 when the link symbol rate is less than the converter symbol rate, and N=1 when the converter and link symbol rates match one another. Symbol replicator 210 provides the N symbol(s) 212 to an RGMII transmitter 214 for transmitting RGMII formatted symbols 216 to converter module 106 over parallel link 124.

In the reverse direction R, an RGMII receiver 217 receives parallel formatted symbols 218 from converter 106 over parallel link 124. RGMII receiver 217 provides conditioned symbols 220 to a programmable symbol extractor 222. Symbol extractor 222 extracts one symbol 224 from each set of N symbols it receives, where N is the ratio of the converter symbol rate to the link symbol rate, and thus equal to or greater than one (1). Symbol extractor 222 passes extracted symbol 224 to MAC controller 206. In turn, MAC controller 206 passes the symbol to switch fabric 204, which selectively routes the symbol to any of links 120.

CPU 132 controls the operation and configuration of MAC module 104 through interfaces 230a, 230b and 230c. For example, controller 132 programs symbol extractor 222 and symbol replicator 210 to operate as described above. In another embodiment, MAC controller 206 controls/configures MAC module 104, and the rest of system 100, instead of controller 132.

Figure 3:
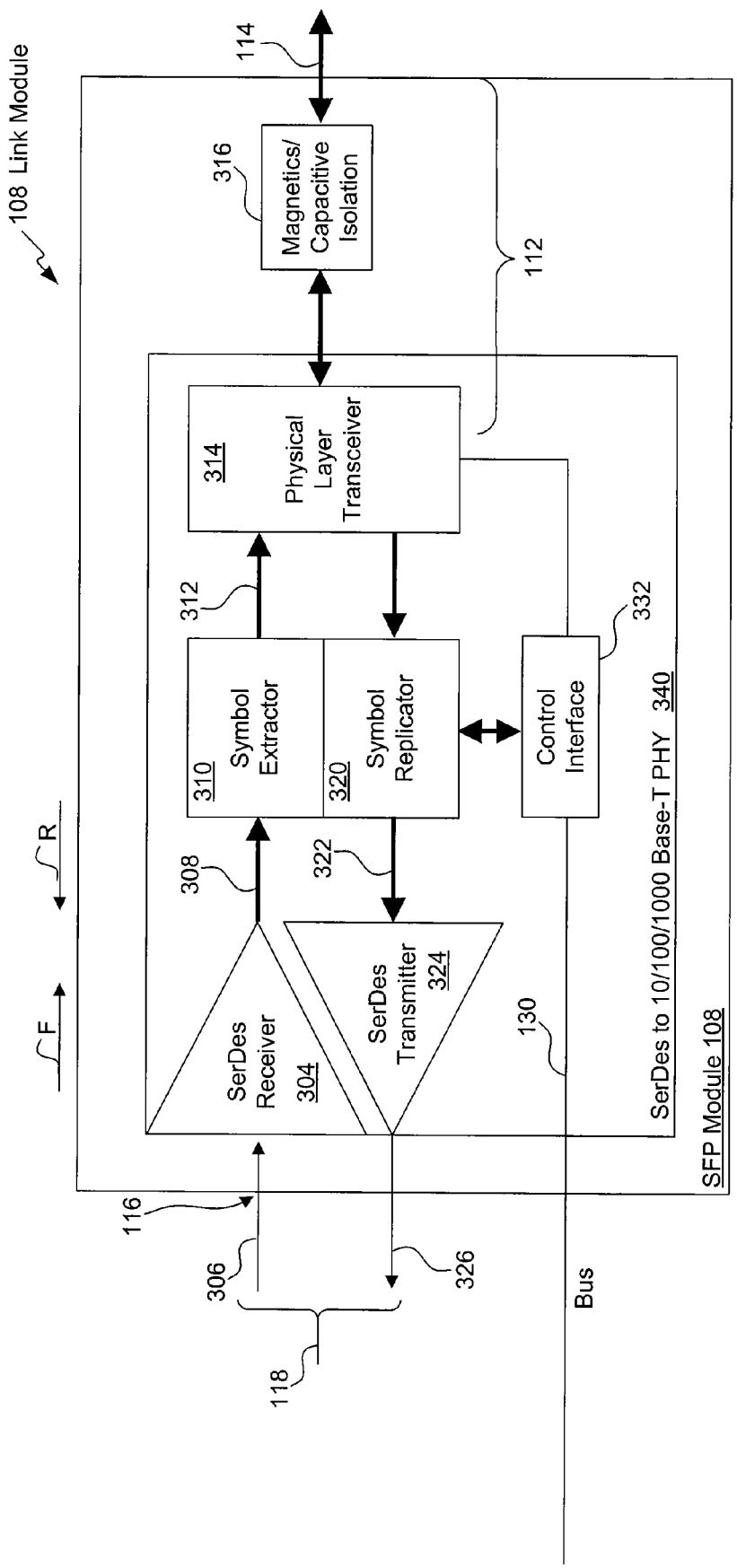
FIG. 3 is a block diagram of an example arrangement of a link module of the system of FIG. 1.

FIG. 3 is a block diagram of an example arrangement of link module 108. In the forward direction F, a SerDes receiver 304 receives serial formatted symbols 306 from converter module 106 over link 118, and provides conditioned received symbols 308 to a programmable symbol extractor 310. Symbol extractor 310 operates in a manner similar to that described for symbol extractor 222 of MAC module 104. For example, symbol extractor 310 extracts one of N same symbols 308 and passes the extracted symbol 312 to a physical layer transceiver 314. Transceiver 314 provides the physical layer symbol to an isolation device 316 coupled between an output of transceiver 314 and serial link 114. Link module 108 transmits the physical layer symbol over serial link 114.

In the reverse direction R, transceiver 314 receives, through isolation device 316, a physical layer symbol transferred over serial link 114. Transceiver 314 passes the symbol to a symbol replicator 320. Symbol replicator 320 operates in a manner similar to that described for symbol replicator 210 of MAC module 104. For example, symbol replicator 320 produces N same symbols 322 to a SerDes transmitter 324. SerDes transmitter 324 transmits the N replicated symbol(s) 326 to converter module 106 over link 118.

In an embodiment, elements 304, 310, 312 314, 320, 324 and 332 form at least part of a BCM5421S or BCM5461S SerDes to 10/100/1000Base-T Physical transceiver device (PHY) 340, made by Broadcom (BCM) Corporation of California.

Controller 132 (FIGS. 1 and 2) controls and collects status from link module 108 over control bus 130 and through an interface 332. Control interface 332 includes a set of status registers that stores the link symbol rate. Controller 132 polls the register set over control bus 130 to determine the link symbol rate. Then, controller 132 configures MAC module 104 and link module 108 according to the determined link symbol rate. For example, controller 132 programs the symbol replicators 210,320 and extractors 222,310 according to the link symbol rate.

Figure 4:
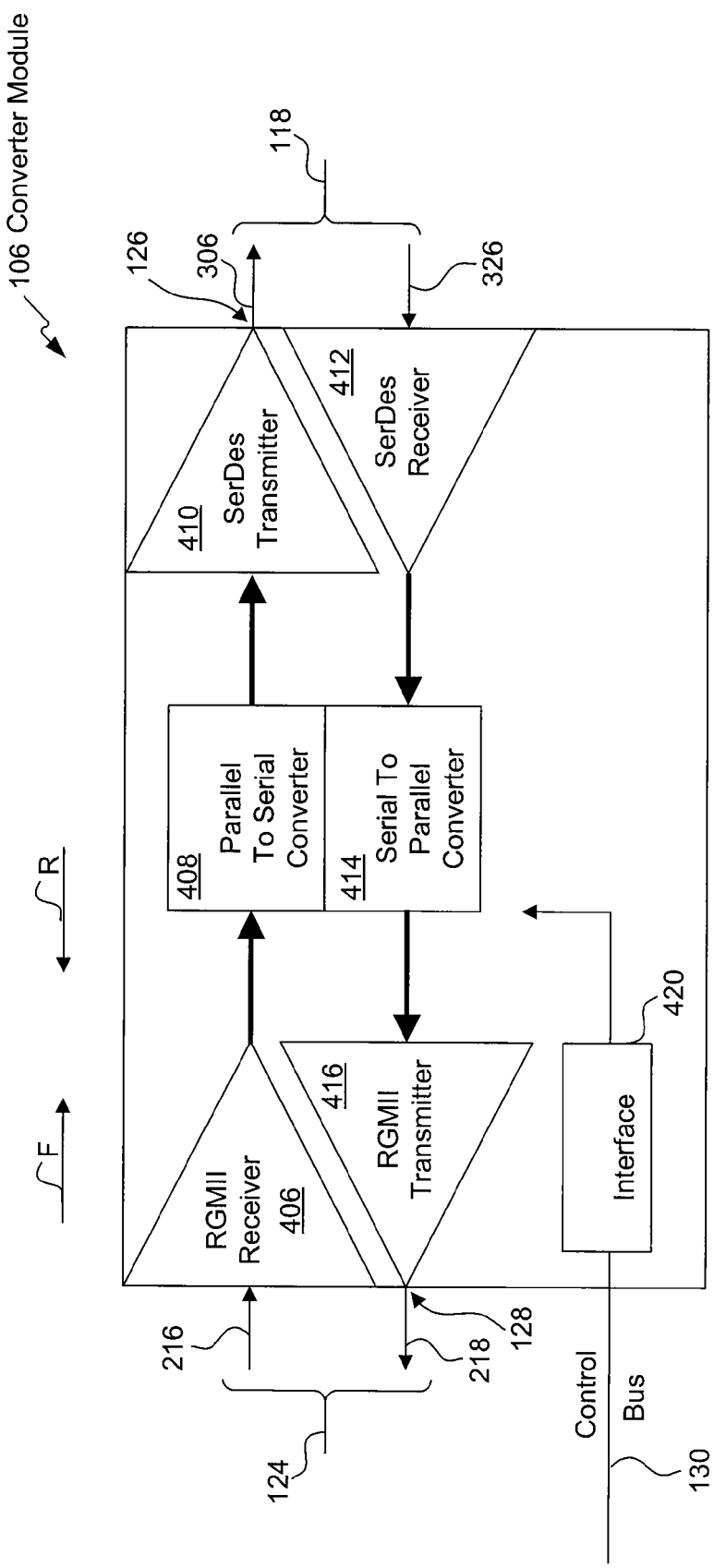
FIG. 4 is a block diagram of an example arrangement of a converter module of the system of FIG. 1.

FIG. 4 is a block diagram of an example arrangement of converter module 106. In the forward direction F, converter module 106 converts parallel formatted symbols 216 from MAC module 104 to serial formatted symbols 306. Converter module 106 includes an RGMII receiver 406, a parallel-to-serial converter 408, and a SerDes transmitter 410 connected in series with one another. Parallel-to-serial converter 408 converts the parallel formatted symbols 216 to the serial format.

In the reverse direction R, converter module 106 converts serial formatted symbol 326 from link module 108 into parallel formatted symbols 218. Converter module 106 includes a SerDes receiver 412, a serial-to-parallel converter 414, and an RGMII transmitter 416, connected in series with one another. Serial-to-parallel converter 414 converts serial formatted symbols 326 to their parallel format. Controller 132 controls and collects status from converter module 106 over control bus 130 and through an interface 420.

In an embodiment, converter module 106 is a BCM5464 or BCM5464R, made by Broadcom Corporation of California.

Figure 5:
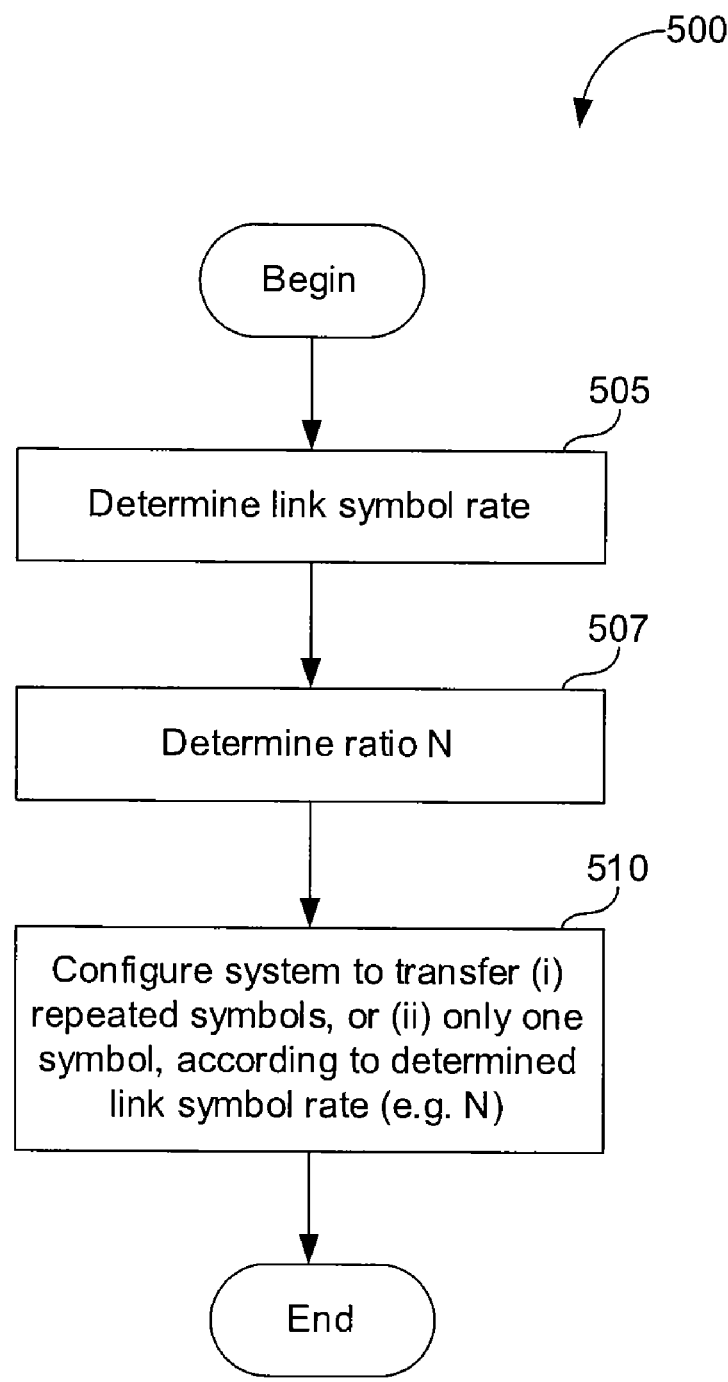
FIG. 5 is a flowchart of an example method of configuring the system of FIG. 1.

FIG. 5 is a flowchart of an example method 500 of configuring system 100 for symbol transfers. In a first step 505, controller 132 determines the link symbol rate. For example, controller 132 polls the set of registers of control interface 332 in link module 108.

In a next step 507, controller 132 determines N, where N represents the ratio of the converter symbol rate to the link symbol rate.

In a next step 510, controller 132 configures MAC module 104, link module 108 and converter module 106 in accordance with the determined link symbol rate. For example, controller 132 configures modules 104-108 to transfer symbols between one another N times each symbol transferred or to-be-transferred over serial link 114, where N is the ratio of the converter symbol rate to the link symbol rate.

In an arrangement of step 510, controller 132 programs symbol replicators 210,320 to produce N same symbols for each symbol they receive. Also, controller 132 programs extractors 222,310 to extract one symbol among each N same symbols they receive.

In an alternative arrangement, MAC controller 206 performs the steps of methods 500 instead of external controller 132.

Figure 6:
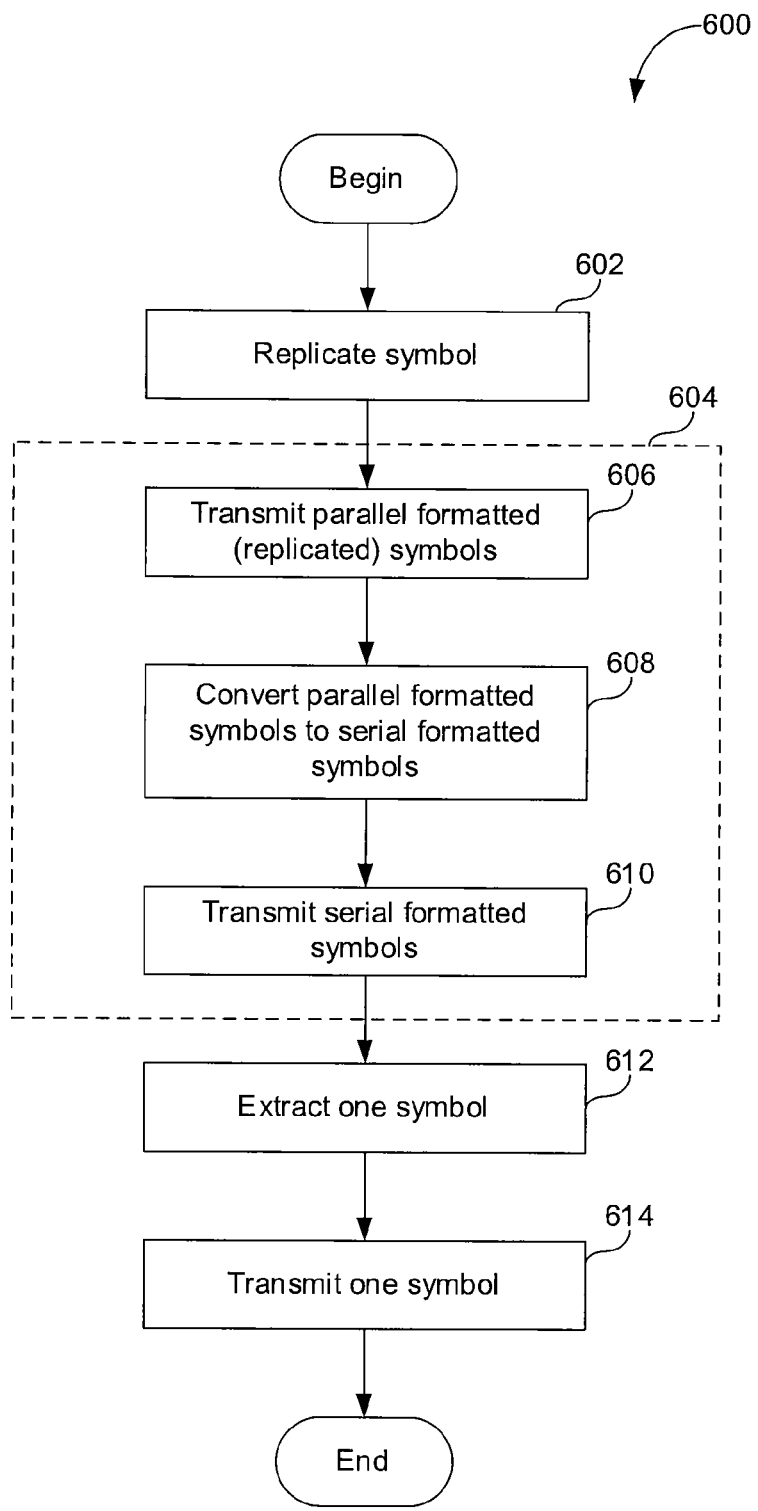
FIG. 6 is a flowchart of an example method of transferring symbols in a forward direction.

FIG. 6 is a flowchart of an example method 600 of transferring symbols in the forward direction. Typically, method 600' is performed after method 500. Method 600 begins when MAC module 104 originates a symbol that is to-be-transferred over link 114. In a first step 602, symbol replicator 210 in MAC module 104 produces N same symbols corresponding to the originated symbol that is to-be-transferred over link 114. N may be one (1) or greater than one depending on the ratio of the converter and link symbol rates, as described above.

In a next step 604, the symbol to-be-transferred is transferred N times from MAC module 104 to link module 108 via converter module 106. Step 604 includes the further steps 606, 608 and 610. At step 606, MAC module 104 transmits parallel formatted (replicated) symbols to converter module 106. At step 608, converter module 106 converts the parallel formatted symbols to serial formatted symbols. At step 610, converter module 106 transmits the serial formatted symbols to link module 108.

At a next step 612, symbol extractor 310 in link module 108 extracts one symbol among the N same symbols received at the link module.

At a next step 614, link module 108 transmits the extracted symbol over serial link 114 at the link symbol rate.

Figure 7:
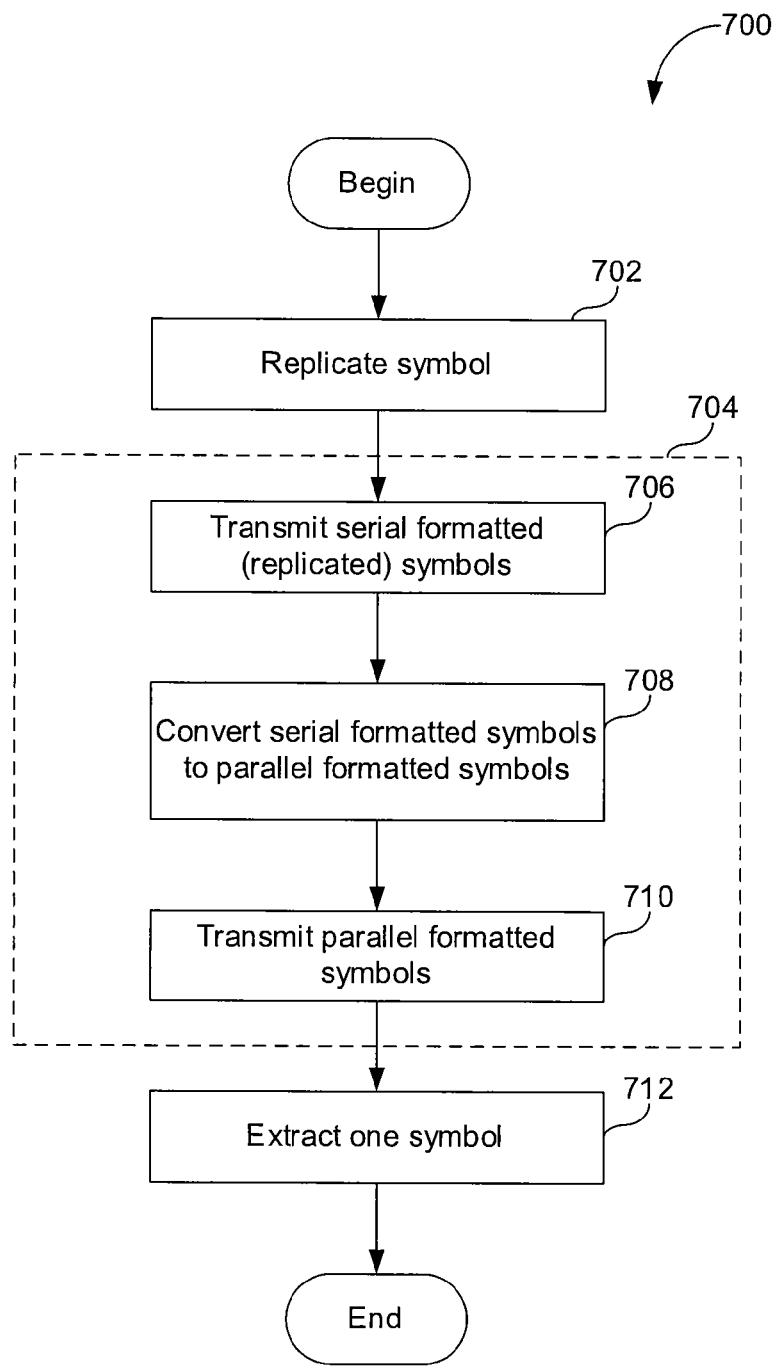
FIG. 7 is a flowchart of an example method of transferring symbols in a reverse direction.

FIG. 7 is a flowchart of an example method of transferring symbols in the reverse direction R. Typically, method 700 is performed after method 500. Method 700 begins when link module 108 receives a symbol that has been transferred over serial link 114.

In a next step 702, symbol replicator 320 produces N same symbols corresponding to the received symbol.

In a next step 704, the symbol to-be-transferred is transferred N times from link module 108 to MAC module 104 via converter module 106. Step 704 includes the further steps 706, 708 and 710. At step 706, link module 108 transmits the serial formatted (replicated) symbols to converter module 106. At step 708, converter module 106 converts the serial formatted symbols to parallel formatted symbols. At step 710, converter module 106 transmits the parallel formatted symbols to MAC module 104.

At a next step 712, symbol extractor 222 in MAC module 104 extracts one symbol among the N same received symbols. The extracted symbol is passed to MAC 206, switch fabric 204 and onto one or more of links 120.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks, modules and/or devices, can be implemented by discrete components including digital and/or analog circuits, application specific integrated circuits, processors executing appropriate software, hardware, firmware and the like or any combination thereof. Thus, the breadth and scope of the present invention should not be limited by any of the above-described exemplary embodiments, but should be defined only in accordance with the following claims and their equivalents.

What is claimed is:

1. A system, comprising:
    a link module having a first serial interface for interfacing to a serial link, and a second serial interface;
    a Media Access Control (MAC) module including a parallel interface; and
    a converter module, coupled between the parallel interface and the second serial interface, configured to convert symbols from a parallel format at the parallel interface to a serial format at the second serial interface;
    wherein the link module and the MAC module are configured to transmit symbols at Gb/s and non-Gb/s rates by transmitting multiple copies of a symbol when necessary to equalize a mismatched symbol rate between the converter module and the serial link.

2. The system of claim 1, wherein (i) the serial link operates at a first symbol rate, and (ii) the converter and link modules are configured to transfer symbols between one another at a second symbol rate, and wherein the converter and link modules are configured to transfer between one another N times each symbol transferred or to-be-transferred over the serial link, where N>1 when the first symbol rate is less than the second symbol rate, so that an effective symbol rate between the converter module and the link module substantially matches the first symbol rate.

3. The system of claim 2, wherein the MAC module includes:
    a symbol replicator configured to replicate a symbol to be transferred multiple times (N) from the parallel interface to the second serial interface; and
    a symbol extractor configured to extract one symbol from among multiple symbols transferred from the second serial interface to the parallel interface.

4. The system of claim 2, wherein N is a ratio of the second symbol rate to the first symbol rate.

5. The system of claim 4, wherein the first symbol rate is variable and the second symbol rate is fixed.

6. The system of claim 2, further comprising:
    a controller, coupled with the link module and the MAC module, configured to
    (i) determine the first symbol rate, and
    (ii) configure the MAC module to transfer symbols N times between itself and the link module according to the determined first symbol rate.

7. The system of claim 6, wherein the controller is part of the MAC module.

8. The system of claim 6, further comprising a control link coupled between the controller and the link module.

9. The system of claim 1, wherein the serial link is an Ethernet link and the first serial interface is an Ethernet interface.

10. The system of claim 1, wherein the MAC parallel interface is a Reduced Gigabit Media Independent Interface (RGMII).

11. The system of claim 1, wherein the MAC parallel interface is a Gigabit Media Independent Interface (GMII).

12. The system of claim 1, wherein the second serial interface is a SerDes interface.

13. The system of claim 1, the MAC module includes a Media Access Controller at least indirectly coupled with the parallel interface.

14. The system of claim 13, wherein the MAC module includes a switch fabric coupled to the Media Access Controller.

15. The system of claim 1, wherein the link module is one of a Gigabit Interface Converter (GBIC) module, a small form factor pluggable (SFP) module, and a custom module.

16. In a system including (i) a link module coupled to a serial link that operates at a first symbol rate, and (ii) a converter module at least indirectly coupled to the link module, wherein the converter and link modules transfer symbols between one another at a second symbol rate, a method comprising:
- (a) determining the first symbol rate; and
- (b) transferring a symbol multiple times between the converter module and the link module when the second symbol rate is greater than the determined first symbol rate, so that an effective symbol rate between the converter module and the link module substantially matches the first symbol rate; and
- whereby the link module can transmit symbols at Gb/s and non-Gb/s rates.

17. The method of claim 16, wherein step (b) comprises transferring the symbol multiple times from the converter module to the link module.

18. The method of claim 17, wherein step (b) further comprises:
- transmitting each symbol from the MAC module as a parallel formatted symbol;
- converting each parallel formatted symbol to a serial formatted symbol; and
- transmitting each serial formatted symbol to the link module.

19. The method of claim 17, further comprising:
- (c) at the link module, extracting one symbol from the multiple symbols transmitted in step (b); and
- (d) transmitting the extracted symbol from the link module to the serial link.

20. The method of claim 17, further comprising, prior to step (b), replicating the symbol at the MAC module.

21. The method of claim 16, further comprising:
- prior to step (b), receiving at the link module a symbol transferred over the serial link,
- wherein step (b) comprises transferring the symbol multiple times from the link module to the MAC module.

22. The method of claim 21, wherein step (b) further comprises:
- transmitting each received symbol from the link module as a serial formatted symbol;
- converting each serial formatted symbol to a parallel formatted symbol; and
- transmitting each parallel formatted symbol to the MAC module.

23. The method of claim 21, further comprising:
- (d) at the MAC module, extracting one symbol from the multiple symbols transferred in step (b); and
- (e) at the MAC module, passing the extracted symbol to a MAC.

24. The method of claim 16, further comprising, between steps (a) and (b), configuring the MAC module to transfer symbols between itself and the link module according to the determined first symbol rate.

25. The method of claim 16, wherein the multiple times is proportional to a ratio of the second symbol rate to the first symbol rate.

26. The method of claim 16, wherein the first symbol rate is variable and the second symbol rate is fixed.

27. The method of claim 16, wherein step (b) further transferring the symbol only one time when the determined first symbol rate is equal to the second symbol rate.

* * * * *